(12) United States Patent
Fujii et al.

(10) Patent No.: US 9,847,744 B2
(45) Date of Patent: Dec. 19, 2017

(54) CONTROLLER AND CONTROL METHOD FOR ROTARY ELECTRIC MACHINE

(71) Applicant: DENSO CORPORATION, Kariya, Aichi-pref. (JP)

(72) Inventors: Kiyoshi Fujii, Kariya (JP); Hideaki Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/919,152

(22) Filed: Oct. 21, 2015

(65) Prior Publication Data

US 2016/0204727 A1    Jul. 14, 2016

(30) Foreign Application Priority Data

Oct. 21, 2014   (JP) .................................. 2014-214864
Jun. 24, 2015   (JP) .................................. 2015-126941

(51) Int. Cl.
| | |
|---|---|
| *H02P 21/00* | (2016.01) |
| *H02P 21/22* | (2016.01) |
| *B60L 15/02* | (2006.01) |
| *B60L 15/20* | (2006.01) |
| *H02P 25/22* | (2006.01) |
| *H02P 27/06* | (2006.01) |
| *H02P 21/20* | (2016.01) |

(52) U.S. Cl.
CPC ............ *H02P 21/22* (2016.02); *B60L 15/025* (2013.01); *B60L 15/2045* (2013.01); *H02P 21/0003* (2013.01); *H02P 21/20* (2016.02); *H02P 25/22* (2013.01); *H02P 27/06* (2013.01)

(58) Field of Classification Search
CPC ...... H02P 21/0089; H02P 21/06; H02P 21/22; H02P 9/305; H02P 21/10; H02P 21/18; H02P 1/029; H02P 21/0085; H02P 21/08; H02P 21/09; H02P 21/24; H02P 2201/07; H02P 2207/05; H02P 25/024; H02P 25/08
USPC .............................. 318/139, 400.02, 400.09
See application file for complete search history.

(56) References Cited

U.S. PATENT DOCUMENTS

| | | | | |
|---|---|---|---|---|
| 4,037,144 A | * | 7/1977 | Ohmae ................... | H02P 7/298 318/493 |
| 5,097,193 A | * | 3/1992 | Neis .......................... | H02P 5/46 318/800 |
| 5,168,416 A | * | 12/1992 | Bailey .................. | B60L 3/0061 322/27 |

(Continued)

FOREIGN PATENT DOCUMENTS

| | | |
|---|---|---|
| JP | H11-178399 A | 7/1999 |
| JP | 2000-050689 A | 2/2000 |

(Continued)

*Primary Examiner* — Paul Ip
(74) *Attorney, Agent, or Firm* — Oliff PLC

(57) ABSTRACT

A control unit applied to a motor that includes a rotor having a field winding and a rotor having armature winding groups to control a field current passed through the field winding. Each of the armature winding groups is applied with a prescribed voltage. The field current is controlled so as to be a minimum field current value If_min with which a deviation between an amplitude of an induced voltage generated in the armature winding groups by rotation of the rotor, and an amplitude of the voltage applied to the armature winding groups becomes equal to or smaller than a prescribed value.

18 Claims, 8 Drawing Sheets

(56) References Cited

U.S. PATENT DOCUMENTS

| | | | | |
|---|---|---|---|---|
| 5,656,911 A * | 8/1997 | Nakayama | H02P 21/0089 | 318/718 |
| 5,796,236 A * | 8/1998 | Royak | H02P 21/09 | 318/801 |
| 5,994,867 A * | 11/1999 | Birk | H02P 21/24 | 318/609 |
| 6,208,108 B1 * | 3/2001 | Nashiki | H02P 25/08 | 318/400.39 |
| 6,326,762 B1 * | 12/2001 | Jiang | H02P 21/36 | 318/799 |
| 6,586,914 B2 * | 7/2003 | Garrigan | B60L 11/02 | 322/28 |
| 6,859,018 B2 * | 2/2005 | Garrigan | B60L 11/02 | 322/28 |
| 6,870,350 B2 * | 3/2005 | Garrigan | B60L 11/02 | 318/700 |
| 7,383,902 B2 * | 6/2008 | Matsuzaki | B60K 6/44 | 180/243 |
| 7,812,557 B2 * | 10/2010 | Maekawa | D06F 37/304 | 318/400.02 |
| 7,969,106 B2 * | 6/2011 | Kitanaka | B60L 11/1803 | 318/400.02 |
| 7,999,501 B2 * | 8/2011 | Atarashi | B60L 15/025 | 310/156.35 |
| 8,552,678 B2 * | 10/2013 | Yuuki | H02K 1/2766 | 318/432 |
| 8,604,735 B2 * | 12/2013 | Filka | H02P 21/0089 | 318/432 |
| 8,643,316 B2 * | 2/2014 | Kono | B60L 3/0023 | 318/139 |
| 8,884,567 B2 * | 11/2014 | Senkou | H02P 21/0096 | 318/434 |
| 2002/0145837 A1 * | 10/2002 | Krefta | B60L 3/0023 | 361/23 |
| 2003/0085683 A1 * | 5/2003 | Satake | H02P 9/007 | 318/727 |
| 2003/0094917 A1 * | 5/2003 | Garrigan | B60L 11/02 | 318/700 |
| 2003/0102884 A1 | 6/2003 | Sato et al. | | |
| 2003/0197490 A1 * | 10/2003 | Garrigan | B60L 11/02 | 322/20 |
| 2003/0205989 A1 * | 11/2003 | Garrigan | B60L 11/02 | 322/28 |
| 2003/0210006 A1 | 11/2003 | Kusaka | | |
| 2004/0008004 A1 * | 1/2004 | Papiernik | H02P 6/08 | 318/721 |
| 2004/0080291 A1 | 4/2004 | Inoue et al. | | |
| 2004/0130283 A1 | 7/2004 | Kuribayashi et al. | | |
| 2004/0135538 A1 * | 7/2004 | Gallegos-Lopez | H02P 21/22 | 318/807 |
| 2004/0163860 A1 * | 8/2004 | Matsuzaki | B60K 6/44 | 180/65.225 |
| 2005/0046370 A1 * | 3/2005 | Gallegos-Lopez | H02P 21/06 | 318/434 |
| 2005/0104551 A1 | 5/2005 | Nishimura et al. | | |
| 2005/0151504 A1 | 7/2005 | Kimura et al. | | |
| 2005/0194924 A1 * | 9/2005 | Satake | H02P 25/02 | 318/720 |
| 2005/0212471 A1 * | 9/2005 | Patel | H02P 21/08 | 318/432 |
| 2005/0212476 A1 | 9/2005 | Satake et al. | | |
| 2005/0242759 A1 | 11/2005 | Fujino et al. | | |
| 2006/0006655 A1 | 1/2006 | Kanazawa et al. | | |
| 2006/0055363 A1 * | 3/2006 | Patel | H02P 21/10 | 318/757 |
| 2006/0138980 A1 | 6/2006 | Kimura et al. | | |
| 2006/0192534 A1 | 8/2006 | Yamauchi et al. | | |
| 2006/0214426 A1 | 9/2006 | Asao et al. | | |
| 2007/0182349 A1 | 8/2007 | Fujita et al. | | |
| 2007/0200346 A1 | 8/2007 | Kanazawa et al. | | |
| 2007/0252547 A1 | 11/2007 | Kifuku et al. | | |
| 2008/0100254 A1 * | 5/2008 | Rahman | H02P 21/22 | 318/715 |
| 2008/0265809 A1 * | 10/2008 | Oi | H02P 21/0003 | 318/139 |
| 2008/0297099 A1 * | 12/2008 | Maekawa | D06F 37/304 | 318/799 |
| 2009/0026999 A1 * | 1/2009 | Atarashi | B60L 15/025 | 318/720 |
| 2009/0027000 A1 * | 1/2009 | Gallegos-Lopez | B60L 15/025 | 318/722 |
| 2009/0302788 A1 | 12/2009 | Mitsuda et al. | | |
| 2009/0322264 A1 * | 12/2009 | Imura | B60L 15/025 | 318/400.09 |
| 2010/0066283 A1 * | 3/2010 | Kitanaka | B60L 11/1803 | 318/400.02 |
| 2010/0097053 A1 | 4/2010 | Kikuchi et al. | | |
| 2010/0110743 A1 * | 5/2010 | Yamasaki | H02M 7/53873 | 363/132 |
| 2010/0219780 A1 * | 9/2010 | Morimoto | H02P 21/06 | 318/400.02 |
| 2011/0043149 A1 | 2/2011 | Kitanaka | | |
| 2011/0050152 A1 * | 3/2011 | Filka | H02P 21/0089 | 318/719 |
| 2011/0062908 A1 | 3/2011 | Kitanaka | | |
| 2011/0074329 A1 | 3/2011 | Matsushita et al. | | |
| 2011/0140642 A1 * | 6/2011 | Kono | B60L 3/0023 | 318/139 |
| 2011/0193504 A1 | 8/2011 | Nakajima et al. | | |
| 2012/0025749 A1 * | 2/2012 | Lai | H02P 21/09 | 318/801 |
| 2013/0234635 A1 | 9/2013 | Kojima | | |
| 2014/0203754 A1 * | 7/2014 | Bhangu | H02P 23/009 | 318/702 |
| 2015/0022127 A1 * | 1/2015 | Takahashi | H02P 6/002 | 318/400.02 |

FOREIGN PATENT DOCUMENTS

| | | |
|---|---|---|
| JP | 2001-298992 A | 10/2001 |
| JP | 2001-333600 A | 11/2001 |
| JP | 2002-238278 A | 8/2002 |
| JP | 2003-074388 A | 3/2003 |
| JP | 2003-153585 A | 5/2003 |
| JP | 2003-333884 A | 11/2003 |
| JP | 2004-048885 A | 2/2004 |
| JP | 2004-144019 A | 5/2004 |
| JP | 2004-187346 A | 7/2004 |
| JP | 2004-222402 A | 8/2004 |
| JP | 2004-266935 A | 9/2004 |
| JP | 2005-020804 A | 1/2005 |
| JP | 2005-039891 A | 2/2005 |
| JP | 2005-204350 A | 7/2005 |
| JP | 2005-237084 A | 9/2005 |
| JP | 2005-253258 A | 9/2005 |
| JP | 2005-287148 A | 10/2005 |
| JP | 2005-318753 A | 11/2005 |
| JP | 2006-033897 A | 2/2006 |
| JP | 2006-238611 A | 9/2006 |
| JP | 2007-104778 A | 4/2007 |
| JP | 2007-185027 A | 7/2007 |
| JP | 2007-189808 A | 7/2007 |
| JP | 2007-300749 A | 11/2007 |
| JP | 2007-318894 A | 12/2007 |
| JP | 2008-109759 A | 5/2008 |
| JP | 2008-173006 A | 7/2008 |
| JP | 2009-177948 A | 8/2009 |
| JP | 2009-183051 A | 8/2009 |
| JP | 2009-257183 A | 11/2009 |
| JP | 2009-268233 A | 11/2009 |
| JP | 2009-296792 A | 12/2009 |
| JP | 2010-081709 A | 4/2010 |
| JP | 2010-104124 A | 5/2010 |
| JP | 2010-161827 A | 7/2010 |
| JP | 2010-273399 A | 12/2010 |
| JP | 4662119 B2 | 3/2011 |
| JP | 2011-072151 A | 4/2011 |
| JP | 2011-151916 A | 8/2011 |
| JP | 2011-166910 A | 8/2011 |

(56) References Cited

FOREIGN PATENT DOCUMENTS

| | | |
|---|---|---|
| JP | 2012-117862 A | 6/2012 |
| JP | 2012-210086 A | 10/2012 |
| JP | 2012-244766 A | 12/2012 |
| JP | 2013-031256 A | 2/2013 |
| JP | 2013-187967 A | 9/2013 |
| WO | 2008/136072 A1 | 11/2008 |
| WO | 2009/040884 A1 | 4/2009 |
| WO | 2009/057188 A1 | 5/2009 |

* cited by examiner

FIG.5
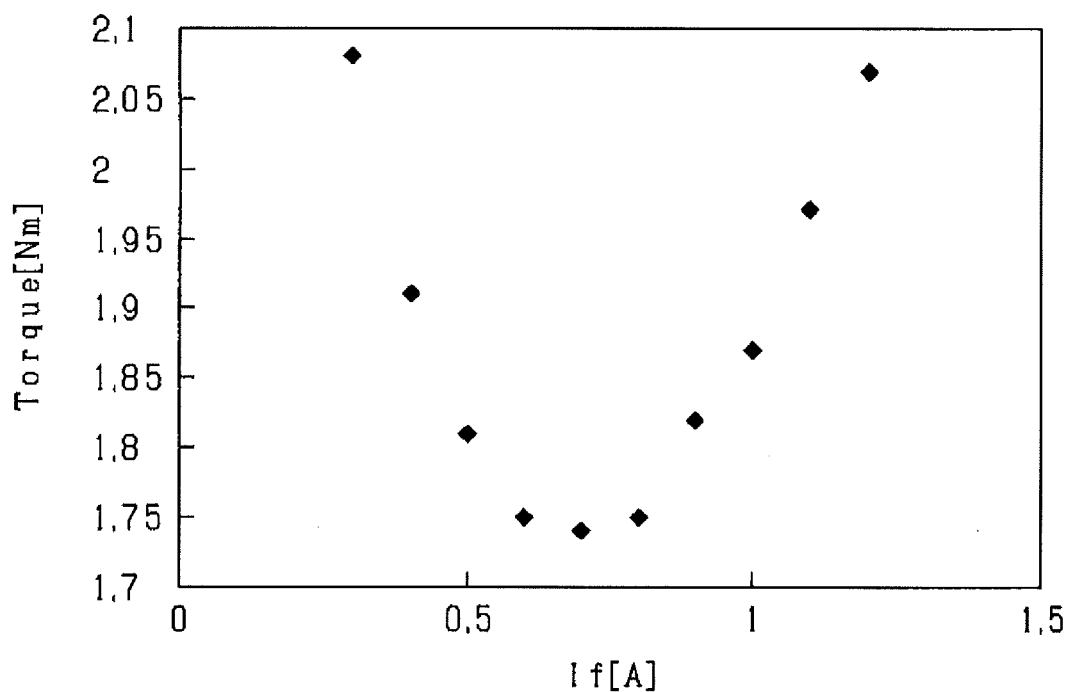
Fig. 6A                    Fig. 6B
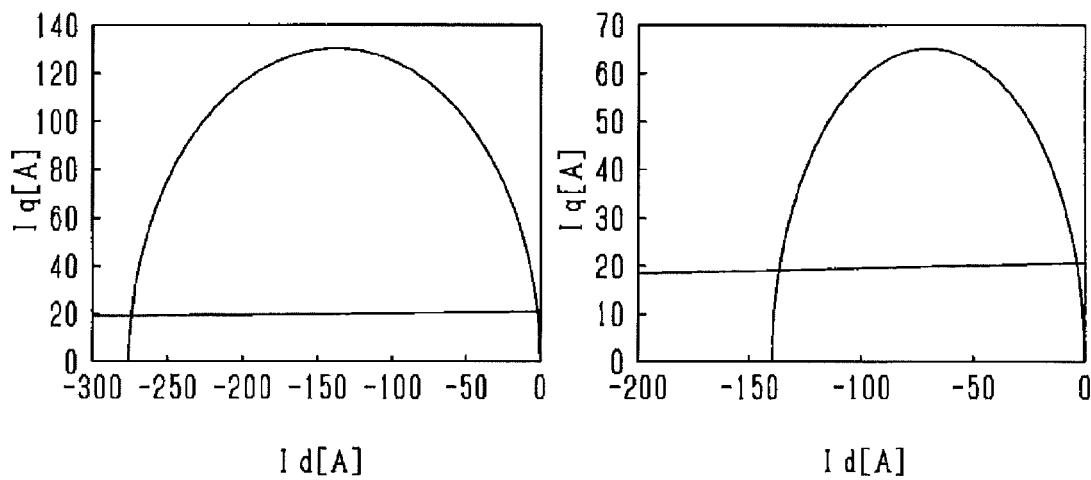

CONTROLLER AND CONTROL METHOD FOR ROTARY ELECTRIC MACHINE

CROSS-REFERENCE TO RELATED APPLICATION

This application is based on and claims the benefit of priority from earlier Japanese Patent Application No. 2014-214864 filed on Oct. 21, 2014, and 2015-126941 filed on Jun. 24, 2015 the description of which are incorporated herein by reference.

BACKGROUND

Technical Field

The present disclosure relates to control techniques to control a field-winding-type rotary electric machine.

Background Art

In recent years, ISGs (integrated starter generators) having functions of both of starters and electric generators have been used for starters and electric generators of automobiles. For the ISGs, field-winding-type alternating-current rotary electric machines are used. Such a vehicle-mounted rotary electric machine is in need of improvement in the power efficiency. For example, PTL 1 proposes techniques for improving the power efficiency of a field-winding-type alternating-current rotary electric machine.

CITATION LIST

Patent Literature

[PTL 1]
JP-B-4662119

According to the techniques described in PTL 1, when the rotational speed of a motor is low, a stator current and a field current are increased to thereby ensure a generated power. In the techniques described in PTL 1, when the rotational speed of the motor becomes higher, the stator current is decreased to reduce a copper loss and maintain a large field current to thereby ensure a generated power. Then, according to the techniques described in PTL 1, when the rotational speed of the motor becomes much higher, the field current is decreased to reduce an iron loss and increase the stator current to thereby ensure a generated power.

The techniques described in PTL 1 need map data in which the value of either an output torque or a generated power, and the value of a rotational speed are used as input values, and a stator current and a field current are used as output values. Accordingly, the techniques described in PTL 1 involve a considerable number of tests and need a storage capacity to store lots of data. Moreover, in the techniques described in PTL 1, the stator current and the field current are simultaneously controlled. Accordingly, in the techniques described in PTL 1, the control over the stator current and the field current is complicated.

SUMMARY

The present disclosure has an object of providing control techniques for a field-winding-type alternating-current rotary electric machine, with which the power efficiency is improved with simple control.

The present disclosure relates to control unit applied to a rotary electric machine that includes a rotor having a field winding and a stator having an armature winding to control a field current passed through the field winding. The armature winding is applied with a prescribed voltage. The field current is controlled so as to be a first field current with which a deviation between an amplitude of an induced voltage generated in the armature winding by rotation of the rotor, and an amplitude of the applied voltage of the armature winding becomes equal to or smaller than a prescribed value.

The present discloser has found that, when the value of the induced voltage and the value of the applied voltage approximate to each other, the amplitude of a phase current passing through the armature winding of the stator will become small. Based on this finding, the control unit of the present disclosure controls the field current passed through the field winding such that a difference between a value of the induced voltage and a value of the applied voltage will be equal to or smaller than a prescribed value. Thus, the control unit of the present disclosure is able to reduce the amplitude of a phase current passing through the armature winding of the stator and reduce power loss caused by the current passing through the armature winding. In this way, the control unit of the present disclosure can improve power efficiency of a field-winding-type alternating-current rotary electric machine with a simple control.

BRIEF DESCRIPTION OF THE DRAWINGS

In the accompanying drawings:

FIG. 5 is a diagram representing a relationship between field current and torque characterisitics;

FIGS. 6(a)-6(b) show diagrams each representing a vector locus with an applied voltage being constant, and a vector locus with a torque being constant, in a dq axis coordinate system;

DETAIL DESCRIPTION OF THE PREFERRED EMBODIMENTS

With reference to the drawings, a first embodiment will hereinafter be described. In the first embodiment, a control unit of the present disclosure is applied to a vehicle provided with an engine.

Figure 1:
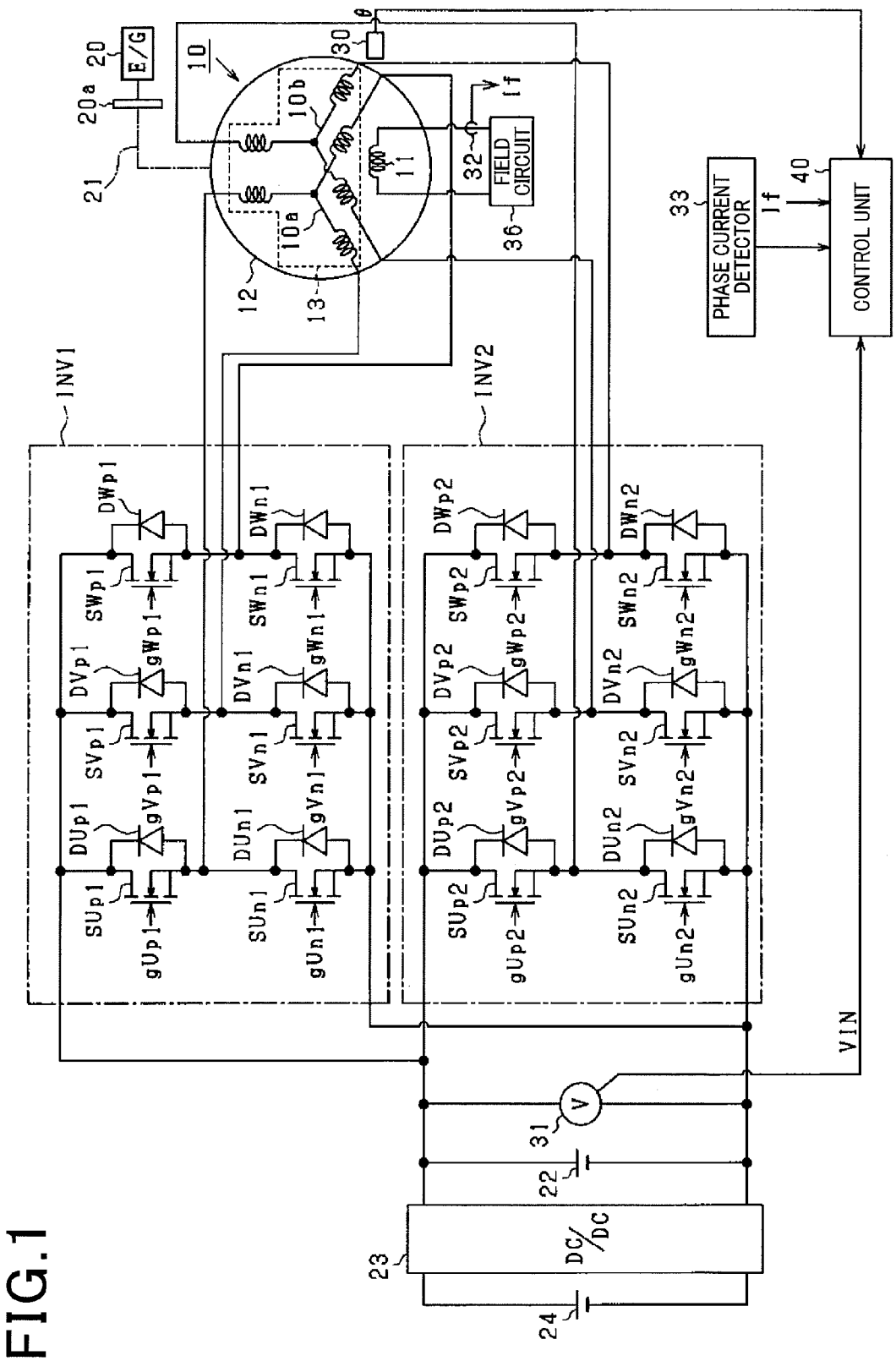
FIG. 1 is an electrical configuration diagram of a present embodiment.
Figure 2A:
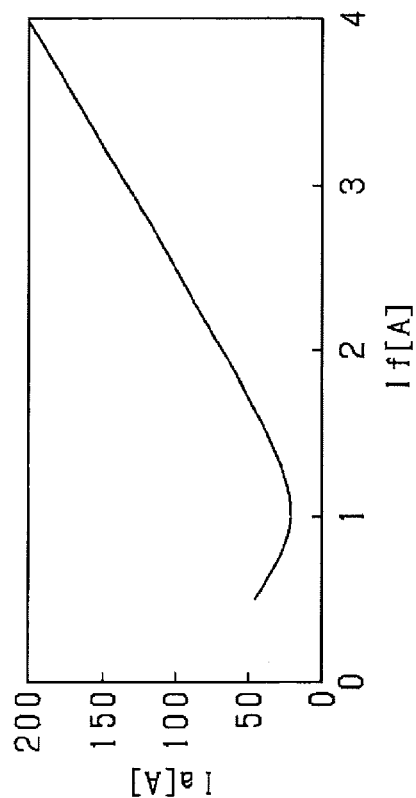
FIGS. 2(a)-2(d) show diagrams each representing field current characteristics of dq axis current.
Figure 2B:
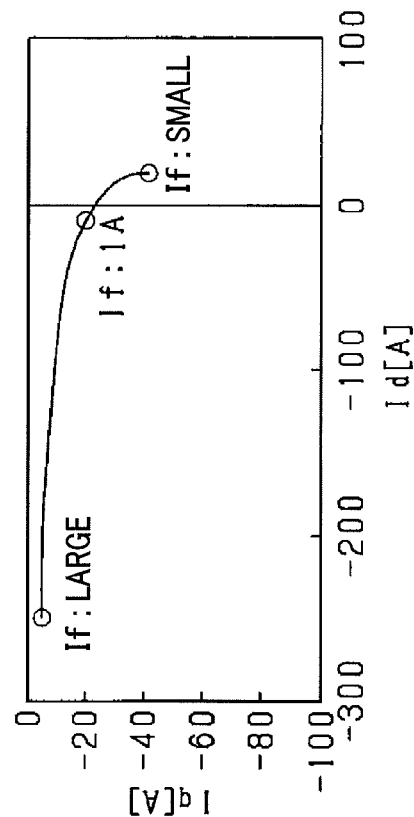
Figure 2C:
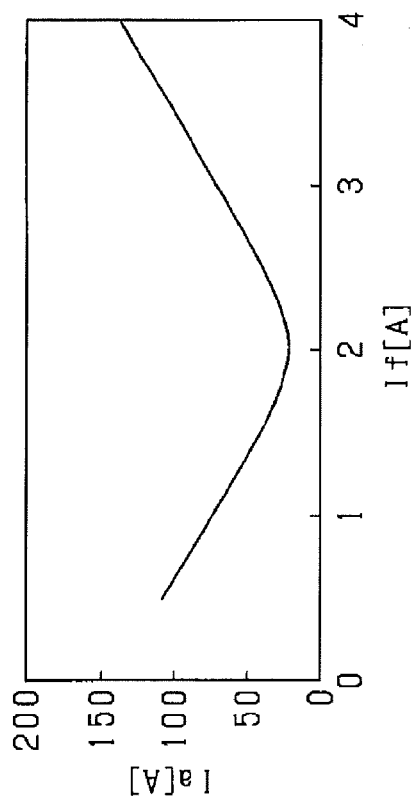
Figure 2D:
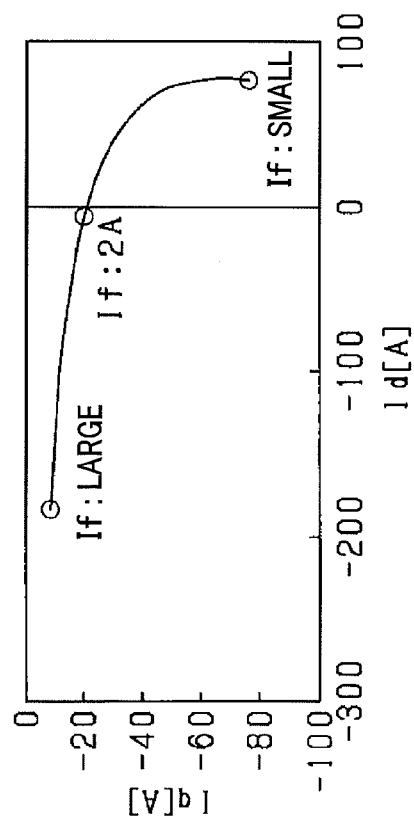

As shown in FIG. 1, a motor 10 is a winding-field-type rotary electric machine that has a multi-phase multiple winding. In the present embodiment, the motor 10 is a winding-field-type synchronous motor having a three-phase double winding. In the present embodiment, an ISG (integrated starter generator) in which the functions of a starter and an alternator (an electric generator) are integrated is taken as the motor 10. In the present embodiment, in particular, the motor 10 functions as a starter when an engine 20 is initially started. Furthermore, in the present embodiment, the motor 10 also functions as a starter when executing a function of automatically stopping and restarting the engine 20 in the case where respective prescribed automatically stopping and restarting conditions are met (e.g., an "idle stop function" or the like).

A rotor 12 configuring the motor 10 includes a field winding 11. The rotor 12 is configured to enable motive power transmission to/from a crankshaft 20a of the engine 20. In the present embodiment, the rotor 12 is coupled to the crankshaft 20a via a belt 21. Specifically, the rotor 12 is directly coupled to the crankshaft 20a via the belt 21.

Two armature winding groups (hereinafter referred to as a "first winding group 10a" and a "second winding group 10b") are wound around a stator 13 of the motor 10. The first and second winding groups 10a and 10b are configured to share the rotor 12. The first and second winding groups 10a and 10b are configured with respective three-phase windings, the three-phase windings having different neutral points. In the present embodiment, a turn number N1 of the wiring configuring the first winding group 10a is set to be equal to a turn number N2 of the wiring configuring the second winding group 10b.

Two inverters (hereinafter referred to as a "first inverter INV1" and a "second inverter INV2") corresponding to the respective first and second winding groups 10a and 10b are electrically connected to the motor 10. Specifically, the first inverter INV1 is connected to the first winding group 10a, while the second inverter INV2 is connected to the second winding group 10b. A high-voltage battery 22 as a direct-current power supply is connected parallel to and shared between the first and second inverters INV1 and INV2. The high-voltage battery 22 is configured such that an output voltage of a low-voltage battery 24, boosted by a boost DCDC converter 23, can be applied thereto. The output voltage of the low-voltage battery 24 (e.g., a "lead battery" or the like) is set to be lower than the output voltage of the high-voltage battery 22 (e.g., a "lithium ion battery" or the like).

The first inverter INV1 includes a first U-phase high potential side switch SUp1, a first V-phase high potential side switch SVp1, a first W-phase high potential side switch SWp1, a first U-phase low potential side switch SUn1, a first V-phase low potential side switch SVn1, and a first W-phase low potential side switch SWn1. Moreover, the first inverter INV1 includes three sets of serial connections in which the U-, V-, and W-phase high and low potential side switches are connected in series on a phase basis. Connecting points of the respective serial connections in the U, V, and W phases are connected to U-, V-, and W-phase terminals, respectively, of the first winding group 10a. In the present embodiment, an N-channel MOSFET is used for each of the high potential side switches SUp1 to SWp1 and each of the low potential side switches SUn1 to SWn1. Diodes DUp1, DVp1, DWp1, DUn1, DVn1, and DWn1 are connected in reverse parallel to the high potential side switches SUp1 to SWp1 and the low potential side switches SUn1 to SWn1, respectively. The diodes DUp1 to DWp1 and DUn1 to DWn1 may be body diodes of the high potential side switches SUp1 to SWp1 and the low potential side switches SUn1 to SWn1, respectively. Moreover, the high potential side switches SUp1 to SWp1 and the low potential side switches SUn1 to SWn1 are not limited to the N-channel MOSFETs, but IGBTs may be used therefor, for example.

As in the first inverter INV1, the second inverter INV2 includes a second U-phase high potential side switch SUp2, a second V-phase high potential side switch SVp2, a second W-phase high potential side switch SWp2, a second U-phase low potential side switch SUn2, a second V-phase low potential side switch SVn2, and a second W-phase low potential side switch SWn2. The second inverter INV2 includes three sets of serial connections in which the U-, V-, and W-phase high and low potential side switches are connected in series on a phase basis. Connecting points of the respective serial connections in the U, V, and W phases are connected to U-, V-, and W-phase terminals, respectively, of the second winding group 10b. In the present embodiment, an N-channel MOSFET is used for each of the high potential side switches SUp2 to SWp2 and each of the low potential side switches SUn2 to SWn2. Diodes DUp2, DVp2, DWp2, DUn2, DVn2, and DWn2 are connected in reverse parallel to the high potential side switches SUp2 to SWp2 and the low potential side switches SUn2 to SWn2, respectively. The diodes DUp2 to DWp1 and DUn1 to DWn2 may be body diodes of the high potential side switches SUp2 to SWp2 and the low potential side switches SUn2 to SWn2, respectively. Moreover, the high potential side switches SUp2 to SWp2 and the low potential side switches SUn2 to SWn2 are not limited to the N-channel MOSFETs, but IGBTs may be used therefor, for example.

A positive electrode terminal of the high-voltage battery 22 is connected to each of high potential side terminals of the first and second inverters INV1 and INV2 (a drain side terminal of each of the high potential side switches SUp1 to SWp2). On the other hand, a negative electrode terminal of the high-voltage battery 22 is connected to each of low potential side terminals (a source side terminal of each of the low potential side switches SUn1 to SWn2).

The field winding 11 is configured such that a direct-current voltage can be applied thereto by a field circuit 36. The field circuit 36 adjusts the direct-current voltage to be applied to the field winding 11 to thereby control a field current If passing through the field winding 11.

The present embodiment includes a control system which is provided with various sensors such as a rotation angle sensor 30, a voltage sensor 31, a field current sensor 32, and a phase current detector 33. The rotation angle sensor 30 is a rotation angle detecting means that detects a rotation angle (an electrical angle $\theta$) of the motor 10. The voltage sensor 31 detects power supply voltages VIN of the first and second inverters INV1 and INV2. The field current sensor 32 detects the field current If passing through the field winding 11. The phase current detector 33 detects phase currents of the first winding group 10a (currents passing through the first winding group 10a in the fixed coordinate system) and phase currents of the second winding group 10b (currents passing through the second winding group 10b in the fixed coordinate system). It should be noted that, as the rotation angle sensor 30, a resolver can be used, for example. Further, as the field current sensor 32 and the phase current detector 33, ones including a current transformer or a resistor, for example, can be used.

Detected values of the various sensors are inputted to a control unit 40. The control unit 40 is a software processing means which includes a central processing unit (CPU), a memory, or the like, and allows the CPU to execute a program stored in the memory. The control unit 40 executes the program to realize prescribed control functions. The control unit 40 performs control such that a controlled variable of the motor 10 is approximated to a command value that commands control over the motor 10. Accordingly, the control unit 40 generates a manipulating signal to manipulate the first and second inverters INV1 and INV2, based on the detected values of the various sensors, and outputs the manipulating signal. A controlled variable of the motor 10 during power running is an output torque T outputted (transmitted) to the crankshaft 20*a*, and its command value is a command torque T*. A controlled variable of the motor 10 during regeneration is an output power P outputted from the motor 10 by power generation (a generated power during regeneration), and its command value is a command power P*. The controlled variable of the motor 10 during power running may be an input power P inputted to the motor 10 (power consumption during power running). The controlled variable of the motor 10 during regeneration may be an input torque T inputted from the crankshaft 20*a* (a loss torque associated with power generation).

The control unit 40 adjusts the field current If passing through the field winding 11 and the phase current passing through the first and second winding groups 10*a* and 10*b* to thereby perform control to cause the output power P (the controlled variable) of the motor 10 to approximate to the command power P* (the command value). The field winding 11 of the rotor 12 has a larger turn number, a larger reactance value, and a larger circuitry time constant, when compared with those of the first and second winding groups 10*a* and 10*b* (the two armature winding groups) of the stator 13. Therefore, in the case of adjusting the field current If to perform control to cause the output power P of the motor 10 to approximate to the command power P*, responsiveness is impaired. During power running as well, in the case of adjusting the field current If to perform control to cause the output torque T of the motor 10 to approximate to the command torque T*, responsiveness is impaired.

To cope with this, the control unit 40 of the present embodiment sets an amplitude Va of the voltage applied to each of the first and second winding groups 10*a* and 10*b* (hereinafter referred to as "applied voltage") to a constant value, and adjusts a phase δ of the applied voltage. The control unit 40 thereby performs control, during regeneration, to cause the output power P of the motor 10 to approximate to the command power P*, and performs control, during power running, to cause the output torque T of the motor 10 to approximate to the command torque T*.

Then, in addition to adjusting the applied voltage, the control unit 40 adjusts the field current If outputted from the field circuit 36. Thus, the control unit 40 performs control for decreasing a copper loss caused by the current passing through the first and second winding groups 10*a* and 10*b*. It should be noted that, in FIG. 1, the signals manipulating the high potential side switches SUp1 to SWp1 of the first inverter INV1 are indicated as first manipulating signals gUp1, gVp1, and gWp1, respectively. Moreover, in FIG. 1, the signals manipulating the low potential side switches SUn1 to SWn1 of the first inverter INV1 are indicated as first manipulating signals gUn1, gVn1, and gWn1, respectively. Furthermore, in FIG. 1, the signals manipulating the high potential side switches SUp2 to SWp2 of the second inverter INV2 are indicated as second manipulating signals gUp2, gVp2, and gWp2, respectively. Moreover, in FIG. 1, the signals manipulating the low potential side switches SUn2 to SWn2 of the second inverter INV2 are indicated as second manipulating signals gUp2, gVn2, and gWn2, respectively. The field circuit 36 may be incorporated into the control unit 40, or may be externally added to the control unit 40.

Referring to FIG. 2(*a*) to FIG. 6(*b*), the relationship between the output power P, the amplitude Va of the applied voltage, the phase δ of the applied voltage, the field current If, the input torque T, and a dq axis current Idq will be described. The description below deals with the case of regeneration. It should be noted that, by replacing the output power P with an input power P, and replacing the input torque T with an output torque T, the description below also serves as the description during power running, and hence the description during power running is omitted.

FIGS. 2(*a*)-2(*d*) show a relationship between the field current If and the dq axis current Idq when the amplitude Va of the applied voltage is set to a constant value (48V) under the condition that the output power P is set to a prescribed command power P* (a constant value). FIGS. 2(*a*) and 2(*b*) differ in rotational speed of the motor 10. The output power P here is determined by multiplying the input torque T by an angular speed ω of the motor 10 (P=T×ω). The dq axis current Idq is a current value obtained by coordinate-transforming each phase current passing through the first and second winding groups 10*a* and 10*b*, detected by the phase current detector 33.

FIG. 2(*a*) shows a relationship between the field current If and a current amplitude Ia of the dq axis current Idq at a prescribed first rotational speed RS1. FIG. 2(*b*) shows a relationship between a q axis current Iq and a d axis current Id in the dq axis current Idq. The current amplitude Ia of the dq axis current Idq is an absolute value of a vector represented by a set of a value of the q axis current Iq and a value of the d axis current Id. The current amplitude Ia of the dq axis current Idq is minimized when the field current If is 2 A. When the field current If decreases or increases from 2 A, the current amplitude Ia of the dq axis current Idq increases. In other words, when the field current If becomes 2 A, power loss caused by the phase currents passing through the first and second winding groups 10*a* and 10*b* is minimized.

FIG. 2(*c*) shows a relationship between the field current If and the current amplitude Ia of the dq axis current Idq at a prescribed second rotational speed RS2 (RS2=2·RS1). FIG. 2(*d*) shows a relationship between the q axis current Iq and the d axis current Id in the dq axis current Idq. Under the condition that the output power P takes a constant value, the rotational speed of the motor 10 shifts from the first rotational speed RS1 to the second rotational speed RS2 (the rotational speed is doubled), decreasing the input torque T to a half. The current amplitude Ia of the dq axis current Idq is minimized when the field current If is 1 A. When the field current If decreases or increases from 1 A, the current amplitude Ia of the dq axis current Idq increases. In other words, when the field current If becomes 1 A, power loss caused by the current passing through the first and second winding groups 10*a* and 10*b* is minimized.

FIGS. 3(*a*)-3(*b*) show a relationship between the amplitude Va of the applied voltage, the field current If, and the current amplitude Ia under the condition that the output power P is set to a prescribed command power P* (a constant value). FIGS. 3(*a*) and 3(*b*) differ in rotational speed of the motor 10.

Figure 3A:
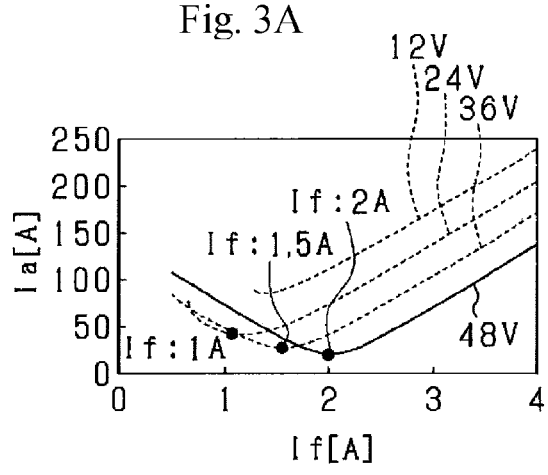
FIGS. 3(a)-3(b) show diagrams each representing a relationship between dq axis current amplitude and field current characteristics in the case of changing an applied voltage.

FIG. 3A shows a relationship between the amplitude Va of the applied voltage, the field current If, and the current amplitude Ia at the prescribed first rotational speed RS1. When the amplitude Va of the applied voltage is 48V, the current amplitude Ia of the dq axis current Idq is minimized at a field current If of 2 A. When the amplitude Va of the applied voltage is 36V, the current amplitude Ia of the dq axis current Idq is minimized at a field current If of 1.5 A. When the amplitude Va of the applied voltage is 24V, the current amplitude Ia of the dq axis current Idq is minimized at a field current If of 1 A. It should be noted that, when the amplitude Va of the applied voltage is 12V and the field current If becomes equal to or smaller than about 1.2 A, the condition for the output power P to take a constant value can no longer be satisfied.

Figure 3B:
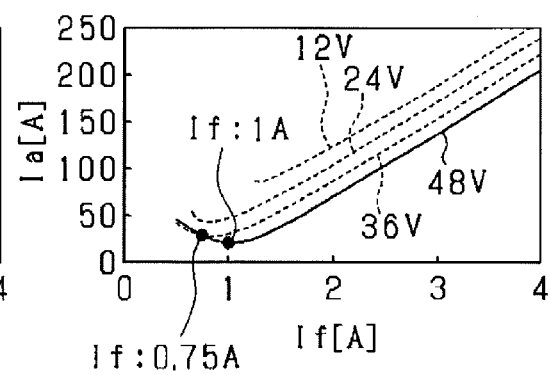

FIG. 3B shows a relationship between the amplitude Va of the applied voltage, the field current If, and the current amplitude Ia at the second rotational speed RS2 (RS2=2·RS1). When the amplitude Va of the applied voltage is 48V, the current amplitude Ia of the dq axis current Idq is minimized at a field current If of 1 A. When the amplitude Va of the applied voltage is 36V, the current amplitude Ia of the dq axis current Idq is minimized at a field current If of 0.75 A. When the amplitude Va of the applied voltage is 24V, the current amplitude Ia is minimized at a field current If of 0.5 A. It should be noted that, when the amplitude Va of the applied voltage is 12V and the field current If becomes equal to or smaller than about 1.2 A, the condition for the output power P to take a constant value can no longer be satisfied.

In the present embodiment, the larger amplitude Va of the applied voltage causes the smaller minimum value of the current amplitude Ia. In other words, in the control unit 40 of the present embodiment, the amplitude Va of the applied voltage is increased and the optimal field current If is permitted to flow to thereby minimize the current amplitude Ia of the dq axis current Idq. Thus, the control unit 40 can minimize the power loss caused by the current passing through the first and second winding groups 10a and 10b.

FIGS. 4(*a*)-4(*b*) show a relationship between the field current If, the output power P, and the current amplitude Ia in the case where the field current If and the phase δ of the applied voltage are changed under the condition that the amplitude Va of the applied voltage is set to a constant value (48V). FIGS. 4(*a*) and 4(*b*) differ in rotational speed of the motor 10.

Figure 4A:
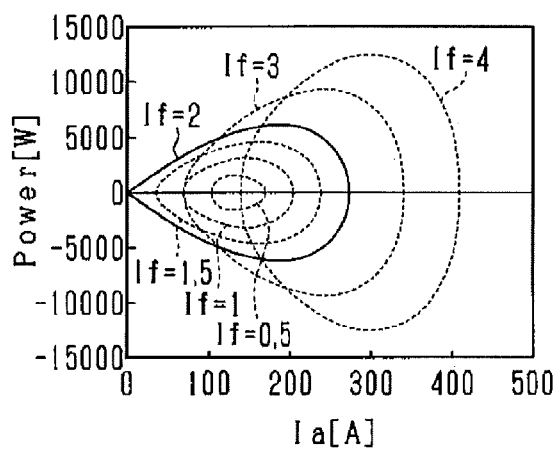
FIGS. 4(a)-4(b) show diagrams each representing a relationship between dq axis current amplitude and output characteristics in the case of changing a field current.

FIG. 4A shows a relationship between the field current If, the output power P, and the current amplitude Ia at the prescribed first rotational speed RS1. In a range where the output power P is equal to or smaller than about 5000 W, the current amplitude Ia is minimized if the field current If is 2 A. In a range where the output power P is larger than about 5000 W, the current amplitude Ia is minimized if the field current If is 3 A. In a range where the output power P is larger than about 8000 W, the current amplitude Ia is minimized if the field current If is 4 A.

Figure 4B:
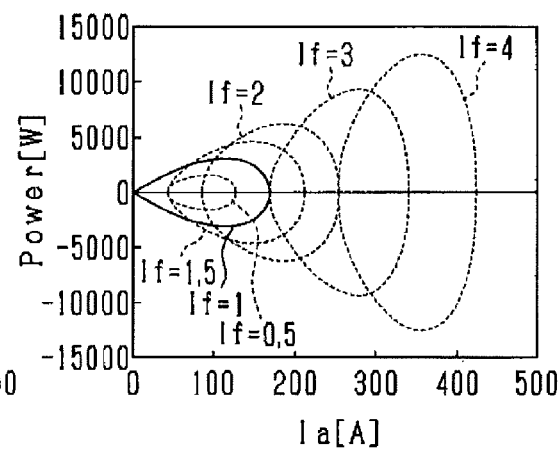

FIG. 4B shows a relationship between the field current If, the output power P, and the current amplitude Ia at the second rotational speed RS2 (RS2=2·RS1). In a range where the output power P is equal to or smaller than about 2500 W, the current amplitude Ia is minimized if the field current If is 1 A. In a range where the output power P is larger than about 2500 W, the current amplitude Ia is minimized if the field current If is 1.5 A. In a range where the output power P is larger than about 4000 W, the current amplitude Ia is minimized if the field current If is 2 A. In a range where the output power P is larger than about 6000 W, the current amplitude Ia is minimized if the field current If is 3 A. In a range where the output power P is larger than about 9000 W, the current amplitude Ia is minimized if the field current If is 4 A.

For example, in the case where the rotational speed of the motor 10 is the first rotational speed RS1 (in the case of FIG. 4A), the field current If is set to 2 A in the range where the output power P is smaller than about 5000 W. In the range where the output power P is equal to larger than about 5000 W and smaller than about 8000 W, the field current If is set to 3 A. In the range where the output power P is larger than about 8000 W, the field current If is set to 4 A. In this way, in the control unit 40 of the present embodiment, the field current If is set in accordance with the output power P to thereby minimize the current amplitude Ia and increase the output power P. It should be noted that the field current If may be changed continuously in accordance with the change of the output power P.

The present discloser conducted experiments under the condition that the amplitude Va of the applied voltage was set to a constant value (37.5V), the rotational speed of the motor 10 was set to a constant value (3000 rpm), and the output power P was set to a constant value (500 W). The present discloser obtained experimental results that showed a relationship between the field current If and the input torque T under this condition. FIG. 5 shows the relationship between the field current If and the input torque T obtained in the experiments. When the field current If becomes about 0.75 A, the input torque T is minimized, and when the field current If becomes larger than or smaller than about 0.75 A, the invalid input torque T that does not contribute to the power generation becomes larger.

When the field current If was 0.25 A, the induced voltage had an amplitude Vb of 16.8V. When the field current If was 0.5 A, the amplitude Vb of the induced voltage was 27.9V. When the field current If was 0.75 A, the amplitude Vb of the induced voltage was 36.7V. When the field current If was 1 A, the amplitude Vb of the induced voltage was 42.1V. When the field current If was 1.25 A, the amplitude Vb of the induced voltage was 52.1V. In other words, the present experiments resulted in that, when the amplitude Vb of the induced voltage and the amplitude Va of the applied voltage coincided with each other, with an error being within a prescribed range (e.g., "when Va=37.5V and Vb=36.7V"), the input torque T satisfying the command power P* took a minimum value.

The control unit 40 of the present embodiment uses the above characteristics as a basis to set the amplitude Va of the applied voltage to a maximum value. In other words, the control unit 40 sets the amplitude Va of the applied voltage to a maximum value of the output voltage of the boost DCDC converter 23 (48V). In this way, in the control unit 40, the amplitude Va of the applied voltage is set to a maximum value to thereby decrease a copper loss caused by the phase currents passing through the first and second winding groups 10a and 10b. Moreover, the control unit 40 adjusts the phase δ of the applied voltage to thereby control the output power P and the output torque T of the motor 10. Specifically, the control unit 40 performs control, during regeneration, to cause the output power P of the motor 10 to approximate to the command power P*, and performs control, during power running, to cause the output torque T of the motor 10 to approximate to the command torque T*. Furthermore, the control unit 40 sets the field current If such that the amplitude Vb of the induced voltage coincides with the amplitude Va of the applied voltage.

FIGS. 6(*a*)-6(*b*) show a relationship between the q axis current Iq and the d axis current Id under the condition that the amplitude Va of the applied voltage is set to a maximum value (48V) and the field current If is set such that the amplitude Vb of the induced voltage coincides with the amplitude Va of the applied voltage. Specifically, FIGS. 6(*a*)-6(*b*) show arcuate loci of current vectors each represented by a combination of the q axis current Iq and the d axis current Id in the dq axis coordinate system (hereinafter each referred to as "voltage limit circle"). Also, FIGS. 6(a)-6(b) show linear loci of current vectors each represented by a combination of the q axis current Iq and the d axis current Id in the dq axis coordinate in the case where the command power P* is constant (hereinafter each referred to as "linear current vector locus"). In FIGS. 6(a)-6(b), each of the intersections of the linear current vector locus when the command power P* is constant and the voltage limit circle represents a combination of the q axis current Iq and the d axis current Id that satisfies the amplitude Va of the applied voltage and the command power P*.

FIG. 6(a) shows a relationship between the linear current vector locus when the command power P* is constant and the voltage limit circle, in the case where the rotational speed of the motor 10 is the first rotational speed RS1. Under the condition shown in FIG. 6(a), the field current If is set to 2 A. FIG. 6(b) shows a relationship between the linear current vector locus when the command power P* is constant and the voltage limit circle, in the case where the rotational speed of the motor 10 is the second rotational speed RS2 (RS2=2·RS1). Under the condition shown in FIG. 6(b), the field current If is set to 1 A.

When FIG. 6B is compared with FIG. 6A, the rotational speed of the motor 10 is doubled, and the field current If is decreased to a half. Accordingly, the q axis currents Iq having the same value, with an error being within a prescribed range, can output an equivalent power. Moreover, with the rotational speed being doubled, the radius of the voltage limit circle shown in FIG. 6B is decreased to a half relative to the radius of the voltage limit circle shown in FIG. 6A.

The d axis current Id is determined by Formula (1).

$$Id=\{-\phi(If)+\sqrt{(Va/\omega)^2-(Lq\cdot Iq)^2}\}/Ld \quad (1)$$

In the formula, $\phi(If)$ is an interlinkage magnetic flux caused by the field current If, $\omega$ is an angular speed of the motor 10, Lq is a q axis inductance, and Ld is a d axis inductance. When the d axis current and the q axis current Iq is taken to be 0 (Id=Iq=0), Formula (1) can be expressed by the following Formula (2).

$$\omega\cdot\phi(If)=Va \quad (2)$$

As expressed by the following Formula (3), the amplitude Vb of the induced voltage is equal to the applied voltage Va.

$$\omega\cdot\phi(If)=\omega\cdot Lf\cdot If \quad (3)$$

In the formula, Lf is an inductance of the field winding 11. In other words, when the amplitude Vb of the induced voltage is equal to the amplitude Va of the applied voltage, the right end of the voltage limit circle is superposed on the origin of the dq axis coordinates.

When the right end of the voltage limit circle is superposed on the origin of the dq axis coordinates ((Id, Iq)=(0, 0)), the intersections of the linear current vector locus when the command power P* is constant and the voltage limit circle approach the origin. Moreover, the d axis current Id at each of the intersections is approximated to 0. Therefore, in the present embodiment, the field current If can be controlled so as to cause the deviation between the amplitude Vb of the induced voltage and the amplitude Va of the applied voltage to approximate to a current value that becomes equal to or smaller than a prescribed value. As a result, the current amplitude Ia of the dq axis current Idq can be decreased. In the present embodiment, the field current If is controlled so as to cause the current value to be a minimum field current value If_min (a first field current) at which the amplitude Vb of the induced voltage coincides with the amplitude Va of the applied voltage coincide, with an error being within a prescribed range.

However, if the field current If becomes the minimum field current value If_min, and then, the value of the field current If becomes constant, the maximum value of the output power P is limited by a value of the q axis current Iq that corresponds to a peak of the voltage limit circle. In this regard, the control unit 40 of the present embodiment controls the field current If so as to cause the current value to be a value larger than the minimum field current value If_min, if the command power P* becomes larger than a prescribed value, or if the command torque T* becomes larger than a prescribed value. In this way, by controlling the field current If to a value equal to or larger than the minimum field current value If_min, the d axis current Id at the intersection (at the right end of the voltage limit circle) of the voltage limit circle and the d axis of the dq axis coordinate system becomes 0 or smaller. Specifically, in the control unit 40, the d axis current Id is used as a basis to calculate a field current reference value If_c (a second field current). Furthermore, in the control unit 40, a prescribed d axis current target value Id* (a target current) is set. In the control unit 40, it is determined whether or not an absolute value of the d axis current Id, a value of which is increased by an increase in command power P* or an increase in command torque T*, exceeds an absolute value of the set d axis current target value Id*. Consequently, in the control unit 40, when the absolute value of the d axis current Id exceeds the absolute value of the d axis current target value Id*, the field current If is controlled so as to cause the current value to be a field current reference value If_c.

Figure 7:
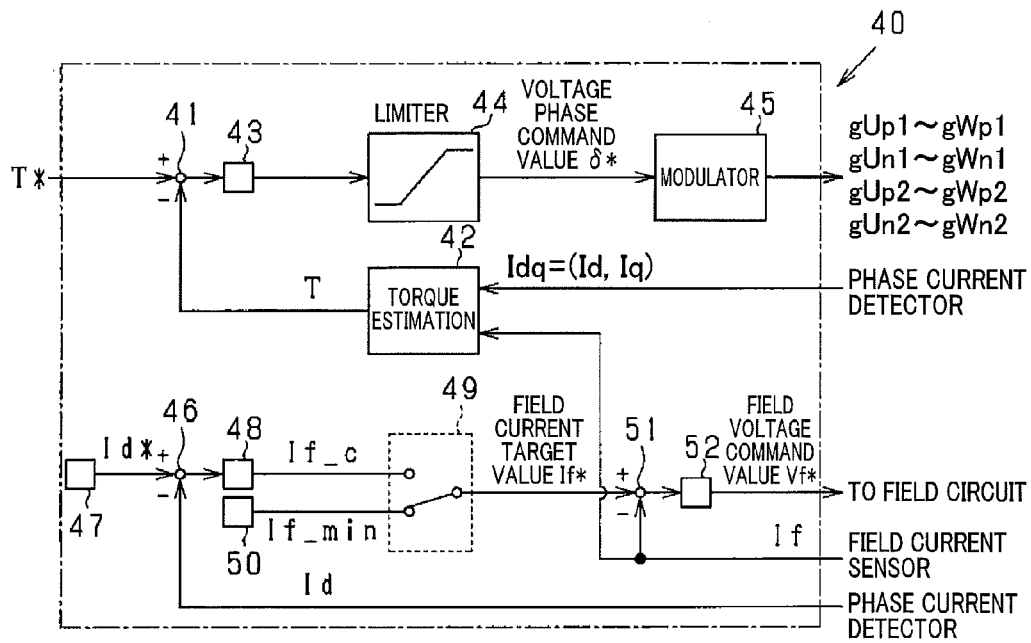
FIG. 7 is a functional block diagram representing functions of a control unit.

FIG. 7 shows a functional block diagram representing a function of the control unit 40 of the present embodiment. The command torque T* is inputted to the control unit 40. The control unit 40 performs control to cause the torque T of the motor 10 to approximate to the inputted command torque T*.

The command torque T* that satisfies the command power P*, and an estimated value of the input torque T are inputted to a deviation calculating means 41 during regeneration. The deviation calculating means 41 calculates a deviation between the inputted command torque T* and the estimated value of the input torque T. Moreover, the command torque T* that satisfies the command power P*, and an estimated value of the output torque T are inputted to the deviation calculating means 41 during power running. The deviation calculating means 41 calculates a deviation between the inputted command torque T* and the estimated value of the output torque T. The estimated value of the torque T is calculated by a torque estimated value calculating means 42. The torque estimated value calculating means 42 calculates an estimated value of the torque T based on a detected value of the d axis current Id and the q axis current Iq passing through the stator 13 (a detected value of the phase current detector 33), a detected value of the field current If (a detected value of the field current sensor 32), and the rotational speed of the motor 10.

The deviation between the command torque T* and the estimated value of the torque T is inputted to a PID control means 43 ("DIP" stands for "proportional integral derivative"). The PID control means 43 performs PDI control over the inputted deviation, and outputs the result. The output value of the PID control means 43 is equivalent to a voltage phase command value $\delta^*$. The voltage phase command value $\delta^*$ is inputted to a phase limiting means (limiter) 44.

The phase limiting means 44 limits an upper limit and a lower limit of the inputted voltage phase command value δ*. The voltage phase command value δ*, whose upper and lower limits have been limited, is inputted to a modulator 45. The modulator 45 controls the first and second inverters INV1 and INV2 so as to cause the voltage phase δ outputted from the first and second inverters INV1 and INV2 (the phase difference between the applied voltage and the phase current) to serve as the voltage phase command value δ*. Specifically, the modulator 45 outputs the first manipulating signals gUp1 to gWp1 that manipulate the high potential side switches SUp1 to SWp1, respectively, of the first inverter INV1 so as to cause the voltage phase δ to serve as the voltage phase command value δ*. Also, the modulator 45 outputs the first manipulating signals gUn1 to gWn1 that manipulate the low potential side switches SUn1 to SWn1, respectively, of the first inverter INV1. Moreover, the modulator 45 outputs the second manipulating signals gUp2 to gWp2 that manipulate the high potential side switches SUp2 to SWp2, respectively, of the second inverter INV2. The modulator 45 outputs the second manipulating signals gUp2 to gWn2 that manipulate the low potential side switches SUn2 to SWn2, respectively, of the second inverter INV2. In other words, in the control unit 40 of the present embodiment, the deviation between the command torque T* and the torque T is provided as an input value, and the voltage phase δ is used as a manipulated variable of the first and second inverters INV1 and INV2, thereby performing the PID control to decrease the deviation between the command torque T* and the torque T. In the control unit 40, a gain of the PID control means 43 is set in accordance with the output torque T. Specifically, in the control unit 40, the gain of the PID control means 43 is set large in a range of the output torque T where variation in value is large, or in a range of the output power P where variation in value is large. Thus, the control unit 40 is able to improve responsiveness to the variation in value of the output torque T or the output power P.

The detected value Id of the d axis current and the d axis current target value Id* are inputted to a deviation calculating means to 46. The deviation calculating means 46 calculates a deviation between the inputted detected value Id of the d axis current and d axis current target value Id*. A target value setting means 47 sets the d axis current target value Id*. The method of setting the d axis current target value Id* performed by the target value setting means 47 will be described later. The deviation between the detected value Id of the d axis current and the d axis current target value Id* is inputted to a PID control means 48. The PID control means 48 performs PDI control over the inputted deviation and outputs the result. The output value of the PID control means 48 is equivalent to the field current reference value If_c. The field current reference value If_c and the minimum field current value If_min are inputted to a target value selecting means 49. The target value selecting means 49 selects either one of the input values as a field current target value If*. The method of selecting the field current target value If* performed by the target value selecting means 49 will be described later. A minimum value setting means 50 uses the map data, in which the rotational speed of the motor 10 and the torque T are used as input values, to set a minimum field current value If_min so that the amplitude Vb of the induced voltage coincides with the amplitude Va of the applied voltage.

The field current target value If* and the detected value If of the field current are inputted to a deviation calculating means 51. The deviation calculating means 51 calculates a deviation between the inputted field current target value If* and detected value If of the field current. The deviation between the field current target value If* and the detected value If of the field current is inputted to a PID control means 52. The PID control means 52 performs PDI control over the inputted deviation and outputs the result. The output value of the PID control means 52 is equivalent to a field voltage command value Vf*. The field voltage command value Vf* is inputted to the field circuit 36.

Figure 8A:
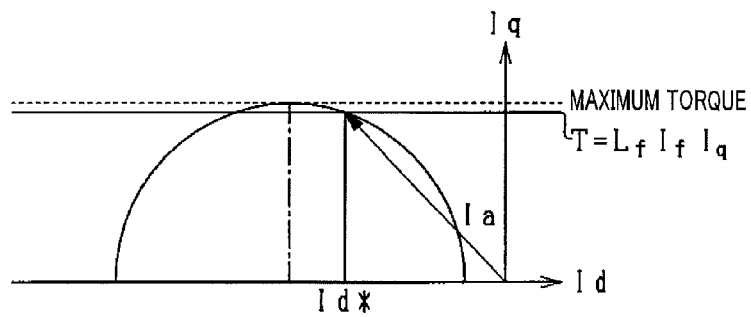
FIGS. 8(a)-8(b) each representing changes in responsiveness and power efficiency, depending on the setting of a d axis current target value.
Figure 8B:
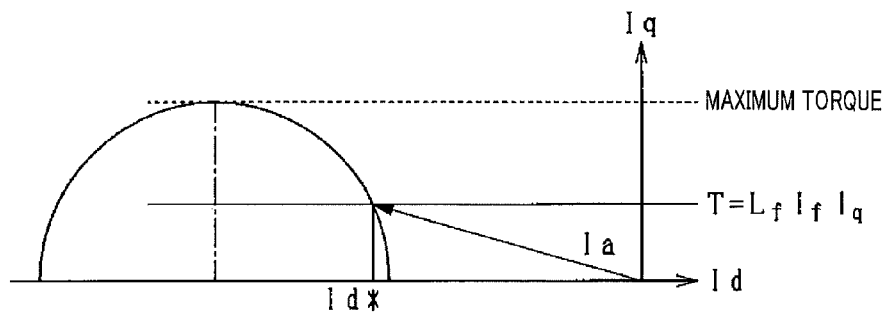

Referring to FIGS. 8(a)-8(b), the method of setting the d axis current target value Id* performed by the target value setting means 47 will be described. FIG. 8(a) shows a voltage limit circle in the case where the d axis current target value Id* is set near the center of the voltage limit circle (on the peak side). FIG. 8(b) shows a voltage limit circle in the case where the d axis current target value Id* is set near the right end of the voltage limit circle (on the q axis side). In FIGS. 8(a)-8(b), the d axis current target value Id* is set in the voltage limit circle such that the current vector is situated on the q axis side of the dq axis coordinate system relative to the peak side where the q axis current Iq is maximized.

The field current If in FIG. 8A is set to be smaller than the field current If in FIG. 8B. Setting a larger field current If causes the voltage limit circle to be further separated from the q axis of the dq axis coordinate system in the negative direction.

The torque T in FIG. 8A is identical to the torque T in FIG. 8B. On the other hand, the field current If in FIG. 8A is smaller than the field current If in FIG. 8B. The torque T is proportional to the q axis current Iq and the field current If. Accordingly, to realize the identical torque T, the q axis current Iq in FIG. 8A is made larger than the q axis current Iq in FIG. 8B.

In the example shown in FIG. 8A, the d axis current target value Id* is set near the center of the voltage limit circle (on the peak side) to thereby increase the q axis current Iq and realize a prescribed torque T with the small field current If. In the example shown in FIG. 8A, the small field current If is set to thereby minimize the d axis current Id that has a low contribution rate to the torque T and improve power efficiency. On the other hand, there is a small difference between the present value of the torque T and the maximum value of the torque T (the maximum torque) (a small difference between the present value of the q axis current Iq and the maximum value of the q axis current Iq). Accordingly, to approximate the torque T to the command torque T*, the field current If needs to be increased. Moreover, the field current If has lower responsiveness to the change in torque T than the phase current does. Accordingly, the responsiveness of the torque T is impaired.

In the example shown in FIG. 8B, the d axis current target value Id* is set near the right end of the voltage limit circle (on the q axis side) to thereby decrease the q axis current Iq and set the field current If to be large so as to realize a prescribed torque T. In the example shown in FIG. 8B, the large field current If is set to thereby make the change in torque T due to the change in the q axis current Iq large, and increase the difference between the present value of the torque T and the maximum value of the torque T (the maximum torque). Thus, in the example shown in FIG. 8B, the responsiveness to the change in torque T is improved. On the other hand, the d axis current Id that has a low contribution rate to the torque T is increased. Accordingly, the power efficiency is lowered.

In this regard, in the setting method of the present embodiment, the d axis current target value Id* is set so as to situate the current vector on the peak side of the voltage limit circle in the case where importance is placed on the improvement of power efficiency, compared to the case where importance is placed on the responsiveness to the variation of the command torque T*. The d axis current Id at the right end of the voltage limit circle has a magnitude Idr which is represented by Formula (4).

$$Idr=(-Lf \cdot If+Va/\omega)/Ld \quad (4)$$

The d axis current Id at the center of the voltage limit circle has a magnitude Idc which is represented by Formula (5).

$$Idc=-Lf \cdot If/Ld \quad (5)$$

In other words, in the present embodiment, if various parameter values used for calculations in Formulas (4) and (5) are obtained, the magnitudes Idr and Idc of the d axis current Id at the right end and at the center of the voltage limit circle, respectively, can be calculated. Specifically, in the present embodiment, if the d axis inductance Ld, the inductance Lf of the field winding 11, the field current If, the amplitude Va of the applied voltage, and the angular speed ω of the motor 10 are obtained, the magnitudes Idr and Idc of the d axis current Id at the right end and at the center of the voltage limit circle, respectively, can be calculated.

The target value setting means 47 uses Formula (6) that is based on the magnitudes Idr and Idc of the d axis current Id at the right end and at the center of the voltage limit circle, respectively, and sets the d axis current target value Id*.

$$Id^*=\alpha \times (-Lf \cdot If/Ld)+(1-\alpha)\times\{(-Lf \cdot If+Va/\omega)/Ld\} \quad (6)$$

For example, when α is set to 0, the d axis current target value Id* is superposed on the right end of the voltage limit circle. When α is set to 1, the d axis current target value Id* is superposed on the peak of the voltage limit circle. When α is set to 0.5, the d axis current target value Id* is superposed on a midpoint between the right end and the peak of the voltage limit circle. In other words, when importance is placed on the improvement of power efficiency, α is set to a value larger than 0.5 so as to situate the d axis current target value Id* on the q axis side relative to the peak of the voltage limit circle and on the peak side relative to the center of the range of the d axis, in the dq axis coordinate system. When importance is placed on the responsiveness of the output torque T and the responsiveness of the output power P, α is set to a value equal to or smaller than 0.5 so as to situate the d axis current target value Id* on the q axis side relative to the peak of the voltage limit circle and on the right end side relative to the center of the range of the d axis, in the dq axis coordinate system.

Figure 9:
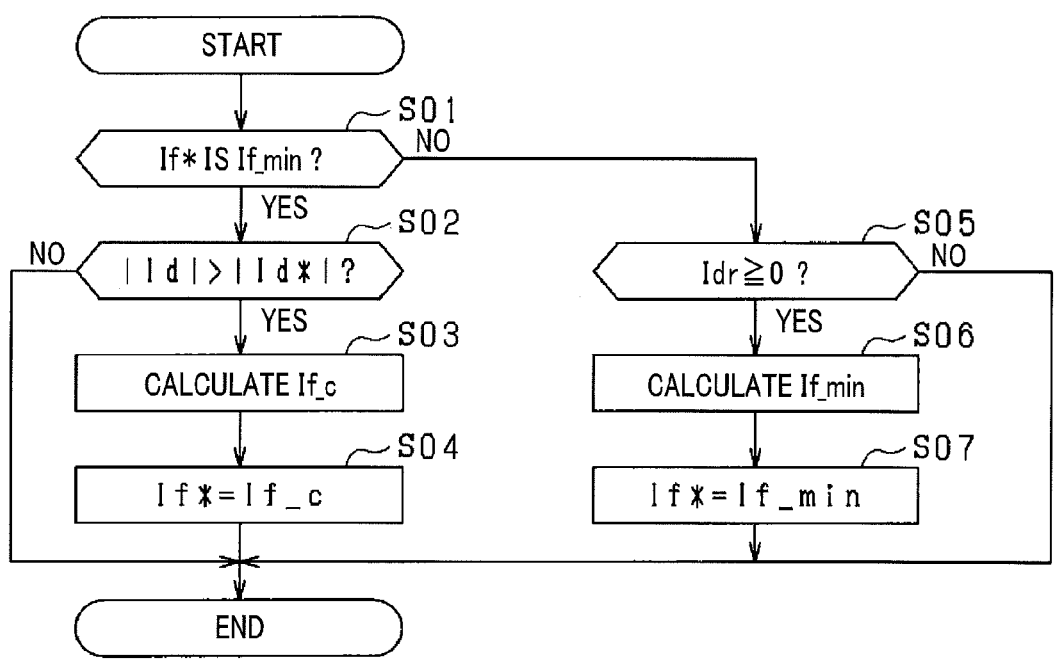
FIG. 9 is a flowchart representing a selection process of a field current target.

Next, referring to FIG. 9, the method of selecting the field current target value If* performed by the target value selecting means 49 will be described.

The target value selecting means 49 of the present embodiment determines whether or not the minimum field current value If_min is selected as the field current target value If* (S01). If the minimum field current value If_min is selected as the field current target value If* (S01: YES), the target value selecting means 49 determines whether or not an absolute value |Id| of the d axis current Id exceeds an absolute value |Id*| of the d axis current target value Id* (S02). If the absolute value |Id| of the d axis current Id exceeds the absolute value |Id*| of the d axis current target value Id* (S02: YES), the target value selecting means 49 calculates the field current reference value If_c on the basis of the deviation between the d axis current Id and the d axis current target value Id* (S03). Then, the target value selecting means 49 selects the field current reference value If_c as the field current target value If* (S04), and terminates the processing. If the absolute value |Id| of the d axis current Id is equal to or smaller than the absolute value |Id*| of the d axis current target value Id* at step S02 (S02: NO), the target value selecting means 49 does not execute the processing at steps S03 and S04, and directly terminates the processing.

On the other hand, if the minimum field current value If_min is not selected as the field current target value If* (S01: NO), the target value selecting means 49 determines whether or not the magnitude Idr of the d axis current Id at the right end of the voltage limit circle is equal to or larger than 0 (S05). If the magnitude Idr of the d axis current Id at the right end of the voltage limit circle is equal to or larger than 0 (S05: YES), the target value selecting means 49 calculates the minimum field current value If_min with which the amplitude Vb of the induced voltage coincides with the amplitude Va of the applied voltage (S06). At this time, the target value selecting means 49 uses the map data that takes the rotational speed of the motor 10 and the output power P as input values, or the map data that takes the rotational speed of the motor 10 and the output torque T as input values to thereby calculate the minimum field current value If_min. The target value selecting means 49 selects the minimum field current value If_min as the field current target value If* (S07), and terminates the processing. If the magnitude Idr of the d axis current Id at the right end of the voltage limit circle is smaller than 0 at step S05 (S05: NO), the target value selecting means 49 does not execute the processing at steps S06 and S07, and directly terminates the processing.

Although the target value selecting means 49 determines whether or not the absolute value |Id| of the d axis current Id exceeds the absolute value |Id*| of the d axis current target value Id* at step S02, the determination method is not limited to this. For example, the target value selecting means 49 may determine at step S02 whether or not the absolute value |Id| of the d axis current Id exceeds a value |Id*-ΔI|, which is obtained by subtracting an allowable value ΔI from the absolute value |Id*| of the d axis current target value Id*. In this case, if the absolute value |Id| of the d axis current Id exceeds the value |Id*-ΔI|, the target value selecting means 49 selects the field current reference value If_c as the field current target value If*. Performing processing in this way, the control unit 40 of the present embodiment is able to improve the responsiveness of the output power P and output torque T.

FIGS. 10(*a*)-10(*f*) show changes in the dq axis current Idq and changes in the field current target value If* in the case where the command torque T* changes from a prescribed value T1 to a prescribed value T2.

Figure 10A:
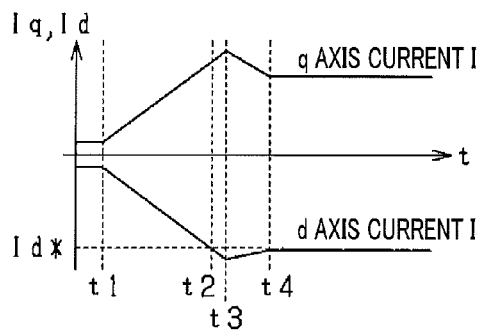
FIGS. 10(a)-10(f) show diagrams each representing an operation of the present embodiment.
Figure 10B:
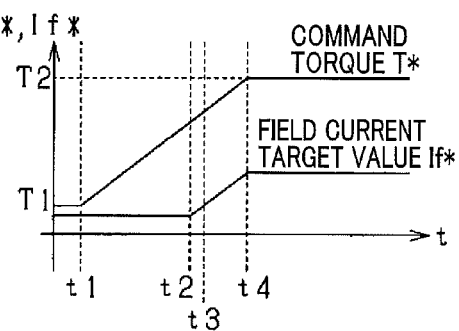
Figure 10C:
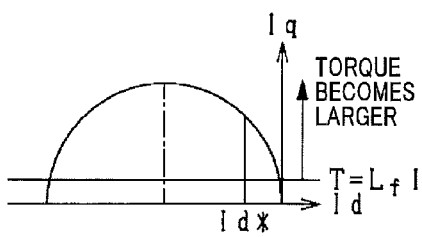
Figure 10D:
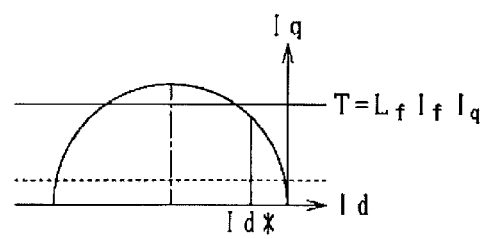
Figure 10E:
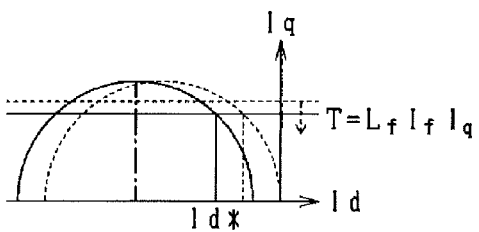
Figure 10F:
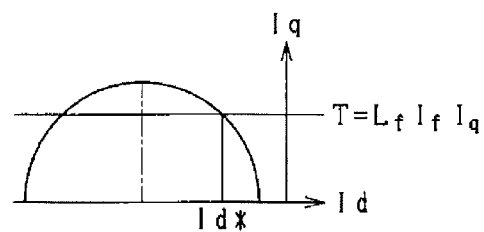

At a time point t1 of FIG. 10B, the command torque T* starts to increase from the prescribed value T1. As shown in FIG. 10A the increase in the command torque T* causes the q axis current Iq to start to increase, and also causes the absolute value |Id| of the d axis current Id to start to increase (the state in FIG. 10C).

At a time point t2 of FIG. 10A, the d axis current Id reaches the d axis current target value Id*. Thus, as shown in FIG. 10B, the field current reference value If_c becomes larger than the minimum field current value If_min, and the field current target value If* starts to increase (the state shown in FIG. 10D).

At a time point t3 of FIG. 10A, after a lapse of time equivalent to the time constant of the field circuit 36, the increase in field current target value If* causes the field current If to start to increase. Accordingly, the q axis current Iq for approximating the torque T to the command torque T* starts to decrease, and the absolute value |Id| of the d axis current Id also starts to decrease (the state shown in FIG. 10E).

At a time point t4 of FIG. 10B, the command torque T* reaches the prescribed value T2. Thus, the change in the q axis current Iq, d axis current Id, and field current If stops (the state shown in FIG. 10F).

The advantageous effects of the present embodiment will be described.

The present discloser has found that, when the amplitude Vb of the induced voltage and the amplitude Va of the applied voltage are similar to each other, the current amplitude Ia of the phase current (the dq axis current Idq) is minimized. Therefore, in the control unit 40 of the present embodiment, based on this finding, the field current If is controlled so as to cause a difference between the amplitude Vb of the induced voltage and the amplitude Va of the applied voltage to be equal to or smaller than a prescribed value. Accordingly, in the control unit 40 of the present embodiment, the current amplitude Ia is decreased, and a power loss (a copper loss) caused by a flow of the phase current is lowered. In this way, in the control unit 40 of the present embodiment, power efficiency in the motor 10 can be improved by simple control.

Specifically, in the control unit 40 of the present embodiment, the control is performed so as to cause the value of the field current If to approximate to the minimum field current value If_min with which the value of the d axis current Id at each of the intersections of the voltage limit circle and the d axis of the dq axis coordinate system becomes 0. Moreover, in the control unit 40, the control is performed so as to cause the value of the field current If to approximate to the field current reference value If_c with which the value of the d axis current Id at each of the intersections of the voltage limit circle and the d axis of the dq axis coordinate system becomes equal to or smaller than 0.

If the field current If is set to the minimum field current value If_min, and then the value of the field current If is made constant, the magnitude of the interlinkage magnetic flux (φ(If)) that is interlinked with the first and second winding groups 10a and 10b is fixed. In this case, the output torque T and the output power P of the motor 10 are determined by the current passing through the first and second winding groups 10a and 10b, and the interlinkage magnetic flux. Therefore, if the magnitude of the interlinkage magnetic flux is limited, the maximum value of each of the output torque T and the output power P is limited. Thus, in the control unit 40 of the present embodiment, if the command torque T* serving as a command value of the output torque T is larger than the prescribed value, or if the command power P* serving as a command value of the output power P is larger than the prescribed value, the field current reference value If_c larger than the minimum field current value If_min is ensured to be set as the field current If. Thus, in the control unit 40 of the present embodiment, the power loss can be minimized, and the maximum value of each of the output torque T and the output power P is prevented from being limited.

The power loss caused by a flow of the phase current is increased by an increase in the d axis current Id. Therefore, in the control unit 40 of the present embodiment, the magnitude of the field current reference value If_c is ensured to be set based on the d axis current Id. Thus, in the control unit 40 of the present embodiment, the power loss caused by an increase in the d axis current Id can be minimized.

The value of the d axis current Id is increased by an increase in the output torque T or in the output power P.

Therefore, in the control unit 40 of the present embodiment, the d axis current target value Id* is set but if the detected value of the d axis current Id exceeds the set d axis current target value Id*, the field current reference value If_c is ensured to be selected as the field current target value If*. Accordingly, in the control unit 40 of the present embodiment, an increase in current amplitude Ia can be minimized, while causing the output torque T to approximate to the command torque T*. Alternatively, in the control unit 40, an increase in current amplitude Ia can be minimized, while causing the output power P to approximate to the command power P*.

In the control unit 40 of the present embodiment, the d axis current target value Id* is ensured to be set on the q axis side of the dq axis coordinate system relative to the peak of the voltage limit circle. Thus, in the present embodiment, the intersections of the current vector locus, in which the output torque T or the output power P has a constant value, and the voltage limit circle approach the origin of the dq axis coordinates (the distance between each of the intersections and the origin is decreased). In other words, in the control unit 40 of the present embodiment, an increase in the current amplitude Ia of the phase current is minimized.

The output torque T and the output power P change in accordance with the q axis current Iq. Therefore, in the control unit 40 of the present embodiment, the d axis current target value Id* is set so as to cause the change in the q axis current Iq relative to the d axis current Id to be larger in the voltage limit circle in the case where importance is placed on the improvement in power efficiency, than in the case where importance is placed on the responsiveness to the variation in the command torque T* or the variation in the command power P*.

Specifically, in the control unit 40 of the present embodiment, in the case where importance is placed on the improvement in power efficiency, the d axis current target value Id* is set on the peak side relative to the midpoint between the peak and the right end of the voltage limit circle. Thus, in the present embodiment, the value of the q axis current Iq is increased, and the value of the field current If is decreased. Consequently, in the control unit 40 of the present embodiment, the value of the field current If is decreased to thereby decrease the current amplitude Ia of the dq axis current Idq (the phase current) and improve power efficiency.

In the control unit 40 of the present embodiment, in the case where importance is placed on the responsiveness to the variation in the command torque T* or the variation in the command power P*, the d axis current target value Id* is set on the q axis side of the dq axis coordinate system relative to the midpoint between the peak and the right end of the voltage limit circle. Thus, in the present embodiment, the change in the q axis current Iq relative to the d axis current Id become larger.

In the control unit 40 of the present embodiment, it is so configured that the amplitude Va of the applied voltage is made constant and the phase δ of the applied voltage is adjusted to thereby control the output torque T and the output power P. This configuration of the control unit 40 of the present embodiment can simplify the control over the phase current (the stator current) passing through the stator 13 and the field current If passing through the field winding 11. Moreover, in the present embodiment, a value of the applied voltage (duty values of the boost DCDC converter 23, and the first and second inverters INV1 and INV2), for example, is set to a maximum value to reduce the current amplitude Ia of the phase current (the dq axis current Idq).

As a result, the control unit 40 of the present embodiment can improve power efficiency.

OTHER EMBODIMENTS

In the above-described embodiment, it is so configured that the field current target value If* is set so as to cause the deviation between the amplitude Va of the applied voltage and the amplitude Vb of the induced voltage to be 0. In another embodiment, this configuration may be changed to one where the field current target value If* is set such that the deviation between the amplitude Va of the applied voltage and the amplitude Vb of the induced voltage is ensured to be equal to or smaller than a prescribed value.

In another embodiment, a control may be performed with which the field current target value If* is constantly set to a minimum field current value If_min. If such a control is performed, power efficiency is improved while the maximum value of each of the output power P and the output torque T is decreased.

In another embodiment, the field current reference value If_c may be set based on the deviation between the command torque T* and the torque T.

In the above-described embodiment, it is so configured that the amplitude Va of the applied voltage has a maximum value, and then the value of the amplitude Va is permitted to be constant. In another embodiment, however, this configuration may be changed.

In the above-described embodiment, the control unit may be a device to which the command power P* is inputted, and which performs control to approximate the input-output power P of the motor 10 to the command power P*. In the case of such a control unit, the deviation between the command power P* and the is input-output power P is used as an input value, the voltage phase δ is used as a manipulated variable of the first and second inverters INV1 and INV2, and the PID control is performed so as to decrease the deviation between the command power P* and the input-output power P.

Furthermore, the above-described embodiment may be changed as follows.

In the control unit 40 of the present modification, it is so configured that the d axis current target value Id* is set so as not to cause the current amplitude Ia of the dq axis current Idq (the phase current) to exceed its upper limit, namely, an upper current amplitude limit IaMAX. In this case, the upper current amplitude limit IaMAX is set to the maximum value of the amplitude of the current inputted/outputted to/from the first and second winding groups 10*a* and 10*b* from the first and second inverters INV1 and INV2, respectively. The control unit 40 of the present modification can minimize damage to the high potential side switches SUp1 to SWp1, the low potential side switches SUn1 to SWn1, and the like, caused by an excessive flow of the current between the first inverter INV1 and the first winding group 10*a*. Further, the control unit 40 of the above-described embodiment can minimize damage to the high potential side switches SUp2 to SWp2, the low potential side switches SUn2 to SWn2, and the like, caused by an excessive flow of the current between the second inverter INV2 and the second winding group 10*b*.

In the control unit 40 of the present modification, the d axis current target value Id* is set so as not to cause the current amplitude Ia of the dq axis current Idq (the phase current) to exceed the upper amplitude limit IaMAX. Then, based the d axis current target value Id* set in this way, the field current target value If* is set so as to maximize the torque T (or the power P). It should be noted that, as shown in FIGS. 10A-10F, the torque T is represented as Formula (7).

$$T = Lf \cdot If \cdot Iq \quad (7)$$

The control unit 40 of the present variation can control the current amplitude Ia of the dq axis current Idq (the phase current) so as not to exceed the upper amplitude limit IaMAX and can maximize the torque T (or the power P).

Specifically, in the control unit 40 of the present modification, if the deviation between the upper amplitude limit IaMAX and the d axis current target value Id* becomes equal to or smaller than a prescribed value (if the d axis current target value Id* approximates to the upper amplitude limit IaMAX), the current amplitude Ia of the dq axis current Idq (the phase current) is set to the upper amplitude limit IaMAX. In this case, the control unit 40 of the above-described embodiment decreases the field current reference value If_c so as to decrease the phase of the current vector. Thus, the control unit 40 of the above-described embodiment sets the field current reference value If_c so as to maximize the torque T (or the power P). Further, the control unit 40 of the present modification decreases the field current reference value If_c until the current vector, which is represented by a combination of the d axis current Id and the q axis current Iq, reaches the peak of the voltage limit circle. Thus, the control unit 40 of the present modification can set the field current target value If* so as to maximize the torque T (or the power P).

Figure 11:
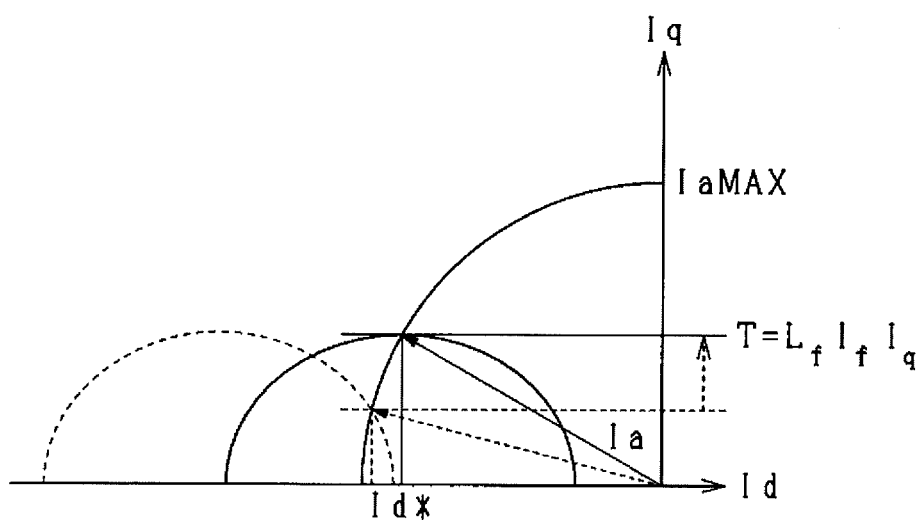
FIG. 11 is a diagram representing settings of a d axis current target value and a field current reference value in a modification.

FIG. 11 shows an example of setting the d axis current target value Id* and the field current reference value If_c of the present modification. In the control unit 40 of the present modification, when the d axis current target value Id* is increased to approximate to the upper amplitude limit IaMAX, the d axis current target value Id* is set so as to cause the current amplitude Ia of the dq axis current Idq (the phase current) to be the upper amplitude limit IaMAX (the dashed line of FIG. 11). Further, the control unit 40 of the present modification decreases the field current reference value If_c to thereby move the voltage limit circle to the q axis side of the dq axis coordinate system. In the control unit 40 of the present modification, the field current If is decreased while the q axis current Iq is increased, to thereby increase the torque T. Then, the control unit 40 of the present modification performs adjustment to lower the field current If until the current vector, which is represented by a combination of the d axis current Id and the q axis current Iq, reaches the peak of the voltage limit circle (the solid line of FIG. 11). In this way, the control unit 40 of the present modification can maximize the torque T.

REFERENCE SIGNS LIST

10 . . . motor, 10*a* . . . first winding group; 10*b* . . . second winding group; 11 . . . field winding; 12 . . . rotor; 13 . . . stator; INV1, INV2 . . . inverter; 40 . . . control unit.

What is claimed is:

1. A control apparatus for a rotary electric machine, comprising:
   a control unit coupled with a rotary electric machine which comprises a rotor having a field winding and a stator having an armature winding to control a field current passed through the field winding, the control unit comprising:
   a memory for storing a program; and
   a processing unit communicable to the memory and configured to execute the stored program, the processing unit being configured to:
select one of a first field current and a second field current larger than the first field current as a field current target value; and
control the field current passed through the field winding, based on the field current target value, wherein:
when a current passing through the armature winding is represented, in a dq axis coordinate system, by a current vector that is a combination of a d axis current and a q axis current, a voltage limit circle being an arcuate locus of the current vector where an amplitude of an applied voltage of the armature winding has a constant value, and
when a magnitude of the d axis current at the right end of the voltage limit circle is equal to or larger than 0, the processing unit calculates the first field current with which a deviation between an amplitude of an induced voltage generated in the armature winding by rotation of the rotor and an amplitude of the applied voltage of the armature winding becomes equal to or smaller than a prescribed value, and selects the first field current as the field current target value.

2. The control unit for a rotary electric machine according to claim 1, wherein, when the current passing through the armature winding is represented, in the dq axis coordinate system, by the current vector that is a combination of the d axis current and the q axis current, the field current is controlled so as to cause the d axis current at each of intersections of a voltage limit circle and a d axis of the dq axis coordinate system to be equal to or smaller than 0.

3. The control unit for a rotary electric machine according to claim 1, wherein, when a command value of an input-output torque or an input-output power of the rotary electric machine becomes larger than a prescribed value, the field current is controlled so as to cause a current value to be a second field current larger than the first field current.

4. The control unit for a rotary electric machine according to claim 3, wherein, the second field current is calculated based on the d axis current passing through the armature winding.

5. The control unit for a rotary electric machine according to claim 4, wherein:
when a current passing through the armature winding is represented, in a dq axis coordinate system, by a current vector that is a combination of a d axis current and a q axis current, a target current serving as a target value of the d axis current is set in a voltage limit circle that is an arcuate locus of the current vector where the applied voltage has an amplitude of a constant value; and
when an absolute value of a detected value of the d axis current exceeds an absolute value of the target current, the field current is controlled so as to cause the current value to be the second field current.

6. The control unit for a rotary electric machine according to claim 5, wherein, the target current is set in the voltage limit circle so as to situate the current vector on a q axis side relative to a peak where the q axis current passing through the armature winding is maximized.

7. The control unit for a rotary electric machine according to claim 6, wherein, the target current is set so as to situate the current vector on the peak side of the voltage limit circle when importance is placed more on power efficiency than on responsiveness to variation of a command value of the input-output torque or the input-output power.

8. The control unit for a rotary electric machine according to claim 7, wherein, when importance is placed on the power efficiency, the target current is set so as to situate the current vector more toward the q axis side than the peak of the voltage limit circle is but on the peak side relative to a center of a range of the d axis.

9. The control unit for a rotary electric machine according claim 7, wherein, when importance is placed on the responsiveness, the target current is so as to situate the current vector more toward the q axis side than the peak of the voltage limit circle is but on the q axis side relative to the center of the range of the d axis.

10. The control unit for a rotary electric machine according to, claim 4, wherein:
when a current passing through the armature winding is represented, in a dq axis coordinate system, by a current vector that is a combination of a d axis current and a q axis current, the target current serving as a target value of the d axis current is set in a voltage limit circle that is an arcuate locus of the current vector where the applied voltage has an amplitude of a constant value;
the rotary electric machine is connected to an inverter inputting/outputting power to/from the armature winding;
a current amplitude that is an amplitude of current passing through the armature winding has an upper amplitude limit as an upper limit that is set to a maximum value of an amplitude of current that can be inputted/outputted from the inverter to the armature winding; and
the target current is set so as not to cause the current amplitude to exceed the upper amplitude limit.

11. The control unit for a rotary electric machine according to claim 10, wherein the second field current is set so as to maximize the input-output torque or the input-output power on the basis of the target current set so as not to cause the current amplitude to exceed the upper amplitude limit.

12. The control unit for a rotary electric machine according to claim 11, wherein, when a deviation between the upper amplitude limit and the target current becomes equal to or smaller than a prescribed value, the current amplitude is set to the upper amplitude limit, and the second field current is decreased to decrease phase of the current vector to thereby set the second field current so as to maximize the input-output torque or the input-output power.

13. The control unit for a rotary electric machine according to claim 12, wherein the second field current is decreased until the current vector reaches a peak of the voltage limit circle, the peak maximizing the q axis current passing through the armature winding.

14. The control unit for a rotary electric machine according to claim 11, wherein:
the applied voltage is permitted to have a constant amplitude; and
phase of the applied voltage is adjusted to thereby control the input-output torque or the input-output power of the rotary electric machine.

15. The control unit for a rotary electric machine according to claim 14, wherein a deviation between a value of the input-output torque and the command value of the input-output torque is used as an input value, phase of the applied voltage is used as a manipulated variable of the inverter to perform PID control such that the deviation is decreased.

16. The control unit for a rotary electric machine according to claim 15, wherein a gain in the PID control is set based on a command value of the input-output torque or the input-output power.

17. The control unit for a rotary electric machine according to claim 14, a deviation between a value of the input-output power and the command value of the input-output power is used as an input value, and phase of the applied voltage is used as a manipulated variable of the inverter to perform PID control such that the deviation is decreased.

18. A control method for a rotary electric machine, the control method being applied to a rotary electric machine which comprises a rotor having a field winding and a stator having an armature winding to control a field current passed through the field winding, the method comprising:

selecting, via a processing unit, one of a first field current and a second field current larger than the first field current as a field current target value; and controlling, via the processing unit, the field current passed through the field winding, based on the field current target value, wherein:

when a current passing through the armature winding is represented, in a dq axis coordinate system, by a current vector that is a combination of a d axis current and a q axis current, a voltage limit circle being an arcuate locus of the current vector where an amplitude of an applied voltage of the armature winding has a constant value, and when a magnitude of the d axis current at the right end of the voltage limit circle is equal to or larger than 0, the processing unit calculates a first field current with which a deviation between an amplitude of an induced voltage generated in the armature winding by rotation of the rotor and an amplitude of the applied voltage of the armature winding becomes equal to or smaller than a prescribed value, and selects the first field current as the field current target value.

* * * * *